United States Patent
de Queiroz et al.

(10) Patent No.: US 6,707,938 B2
(45) Date of Patent: Mar. 16, 2004

(54) PRINCIPAL AXIS LOOK-UP FOR COLOR CORRECTION

(75) Inventors: Ricardo L. de Queiroz, Pittsford, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 627 days.

(21) Appl. No.: 09/731,340

(22) Filed: Dec. 6, 2000

(65) Prior Publication Data

US 2002/0067848 A1 Jun. 6, 2002

(51) Int. Cl.[7] .................................................. G06K 9/00
(52) U.S. Cl. ...................................... 382/162; 382/167
(58) Field of Search .............................. 382/162, 167, 382/169, 274; 358/518, 523; 345/604

(56) References Cited

U.S. PATENT DOCUMENTS

| | | |
|---|---|---|
| 5,787,193 A | 7/1998 | Balasubramanian |
| 5,870,077 A * | 2/1999 | Dillinger et al. ............ 382/162 |
| 6,009,192 A | 12/1999 | Klassen et al. |
| 6,389,161 B1 * | 5/2002 | Krabbenhoft ............... 382/167 |
| 6,636,628 B1 * | 10/2003 | Wang et al. ................ 382/167 |

* cited by examiner

Primary Examiner—Phuoc Tran
(74) Attorney, Agent, or Firm—Fay, Sharpe, Fagan, Minnich & McKee, LLP

(57) ABSTRACT

A simplified color space transformation method uses a principal axis or dominating parameter in a first color space to determine the value of an associated axis in a second color space. Transformation curves relating the principal axis to the associated second space axis are predetermined and stored. Each curve describes the relationship between the principal axis and the associated axis given certain values for remaining, secondary or non-principal first color space axes. In operation the non-principal axes are used to calculate index values. For example, the non-principal values are quantized. The index values are used to access an appropriate curve. The principal axis value is used as an index into the appropriate curve. An image processor operative to perform the method comprises a transformation curve library. Software modules running on a computational device, such as, a microprocessor or digital signal processor analyze image pixels and access appropriate curves for use in transforming the pixel into a new color space.

15 Claims, 6 Drawing Sheets

PRINCIPAL AXIS LOOK-UP FOR COLOR CORRECTION

BACKGROUND OF THE INVENTION

The present invention is directed to the digital imaging arts. It finds particular application to a method of color correction transformation for image processors and will be described with particular reference thereto. It is to be appreciated that the present invention can also be applied to any type of multidimensional transformation process including color space transformation, device calibration and characterization, color correction, and the like.

Computers and other electronic equipment typically depict color in 3-D coordinates such as RGB (Red, Green, Blue). Many printers, on the other hand, print in either three-dimensional colorant space, cyan, magenta, yellow (CMY) or four-dimensional colorant space, cyan, magenta, yellow, and black (CMYK) which correspond to the input values, e.g. RGB. Frequently, a device independent color space is used as an intermediate representation of the image. A common choice for such a device independent space is a luminance-chrominance space, denoted generically as LC1C2. The L component represents luminance or lightness, and C1 and C2 are the two chrominance axes representing, for example, red-green and yellow-blue variations, respectively. An example of such a space is CIELAB wherein luminance is designated by L* and the two chrominance coordinates are designated a* and b*. For example, translations are then derived from input RGB to LC1C2, and from LC1C2 to printer colorant space.

Transforms from one color space to another are known. For example, transformations from colorimetric RGB to printer RGB space, calorimetric RGB to printer CMY space, scanner RGB to calorimetric RGB space and so on have been accomplished. Such transformations are typically implemented through the use of 3-D look-up tables (LUT). The entries in the 3-D LUT are indexed with parameters or axes that are based on the axes of the input space. For example, a 3-D LUT has a red axis or index, a green index and a blue index. Inputs to these LUTs are typically axis values in the input color space or protocol and intersections or nodes typically contain axis values in the output color space.

For example, in the case of a LUT transform to translate color from a LC1C2 color space to a CMYK space of a printer, a predefined set of CMYK digital values are sent to the printer. The printer prints a corresponding set of color patches. The calibration color patches are measured and a colorimetric LC1C2 coordinate or set of axes values is determined for each patch, i.e. for each of the predefined CMYK values. Each of the measured LC1C2 coordinates then, identifies a three-dimensional vector location within the three-dimensional space. Each LC1C2 coordinate is typically represented by 8-bit values for each of the L, C1, and C2 components. Although such a 24-bit LC1C2 coordinate is capable of addressing over 16.77 million locations, the lookup table is typically partitioned into a smaller size, such as 16×16×16 (4096) table locations, each node of which stores a CMYK value. After the calibration patches are produced, each measured LC1C2 coordinate has a corresponding known CMYK value. Unfortunately, the input LC1C2 coordinates do not, in general, perfectly coincide with the node locations (i.e. the three dimensional intersection points) of the look-up table. Hence, the CMYK values placed at the nodes are estimated by some multidimensional data fitting technique such as Shepard's algorithm.

CMYK values at intermediate LC1C2 points are determined by a form of interpolation among the LUT nodes. The size of the look-up table is a compromise between access speed and desired accuracy on the one hand (i.e. the fidelity of the output) and the expense of storing a large number of values on the other.

An illustration of the operation of a look-up table is instructive. Referring to FIG. 1, an input LC1C2 value is used to determine index values L', C1', C2' into the table 112. The index values are used to locate the color within the table. For example, the color is located a point 116 that does not coincide with any node locations 120. Therefore there is no transformation value directly available from the table 112 for converting the input value into a printer specific CMYK value. Instead, the conversion is accomplished by interpolating the known CMYK values corresponding to the nearest nodes 124 to the input LC1C2 coordinate location 116.

The color is defined in three dimensions. Therefore, the interpolation is similarly done in three dimensions. Common examples of 3-D interpolation techniques include trilinear, tetrahedral, and prism interpolation. Of these, tetrahedral interpolation is the fastest method, requiring interpolation only among 4 nodes. (The trilinear and prism schemes utilize 8 and 6 nodes, respectively.) All these techniques require several multiplication, addition, shift, and comparison operations for each output signal or axis value at each pixel; and are often implemented with special purpose hardware.

This interpolated CMYK value is then output and rendered, for example, by a printer. Unfortunately, three-dimensional interpolation presents a significant computational burden for many applications. Typically each axis describing a color space is represented by an 8-bit word. Therefore, each axis is divided into 256 levels. As mentioned above, where a color space is described by three such 8-bit axes, the color space comprises over 16.77 million different axis values or colors. Therefore, a pure look-up table transformation is prohibitively expensive in terms of memory requirements in some applications. It is for this reason that look-up table based transformations typically use look-up tables that include only a small fraction of the possible axes value combinations and use interpolation to approximate the unincluded values. Of course, the memory savings is paid for in computational time or degraded image quality. Therefore, a fast, computationally inexpensive method of color correction and color space transformations is needed which produces satisfactory image output quality.

BRIEF SUMMARY OF THE INVENTION

To those ends, a fast, low cost method of color correction transformation has been developed. The method comprises the steps of selecting a first color space, wherein colors are defined by a first set of axes, selecting a second color space wherein colors are defined by a second set of axes, associating with each axis in the second set, a principal axis from the first set, the principal axis characterized by a predominating transformation relationship the principal axis has with the second set axis as compared to transformation relationships remaining (non-principal) first set axes have with the second set axis, and predetermining for each second set axis an associated set of tone reproduction curves describing the transformation relationship between the second set axis and the associated principal axis, wherein each tone reproduction curve in the set is calibrated in light of selected values of the non-principal first set axes, and wherein each curve in the set is indexed and referenced by the selected remaining first set axis values.

Some embodiments of the method further comprise the steps of accepting a color, described by first set axis values (from the first color space), for transformation into second set axis values (of the second color space), selecting a second set axis for determination, accessing the set of tone reproduction curves associated with the selected second set axis, determining selection indices based on the non-principal first set axis values, using the selection indices to select an appropriate tone reproduction curve from the accessed set, and using the principal axis as an index into the selected tone reproduction curve to determine a value for the selected second set axis.

The method is useful for transforming between a wide variety of spaces, including, for example RGB, CMY, CMYK, L*a*b*, CIELAB and other color spaces.

An image processor operative to perform the steps of the method comprises a library of transformation curves, the curves describing relationships between principal axes in a first color space to associated axes in a second color space, each curve describing the relationship given a unique set of values for remaining (non-principal) first color space axes and software stored in a computer memory and processed by a computational device. The software operates to; analyze a pixel describing a color in terms of a first color space; access curves in the curve library based on that analysis, and use the curves to generate a description of the color in terms of a second color space.

One advantage of the present invention resides in the speed with which it transforms an image from one color space to another.

Another advantage of the present invention is found in the low cost of computational devices that successfully perform the method.

Yet another advantage of the present invention is that any errors in image transformation introduced by the method are often masked by noise present in the image.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Within almost any multidimensional transformation the influence of certain terms or axes is more significant than the influence of certain other terms. For example, the weighting factor or coefficient on one term in a transformation equation is greater than the weighting factor of other terms.

There are principal axes and remaining or non-principal axes involved in the art of color transformation. For example red and cyan are strongly related. Ideally a cyan colorant reflects all visible light except for red. Therefore, the amount of cyan used in a printed image is a strong function of the amount of red in the image. However, the amount of cyan required is also affected by the amount of, for example, blue in the image. Therefore, a transformation curve relating the amount of cyan needed in a CMY output pixel, has a shape that is a strong function of the amount of red in an RGB input version of the pixel. However, the shape of the curve is changed somewhat by the amount of blue in the input pixel. Therefore in this example, red is termed as the principal axis associated with cyan, while blue is a non-principal axis. The present invention exploits these strong and weak colorant relationships to minimize computations required in transforming between color spaces.

Figure 2:
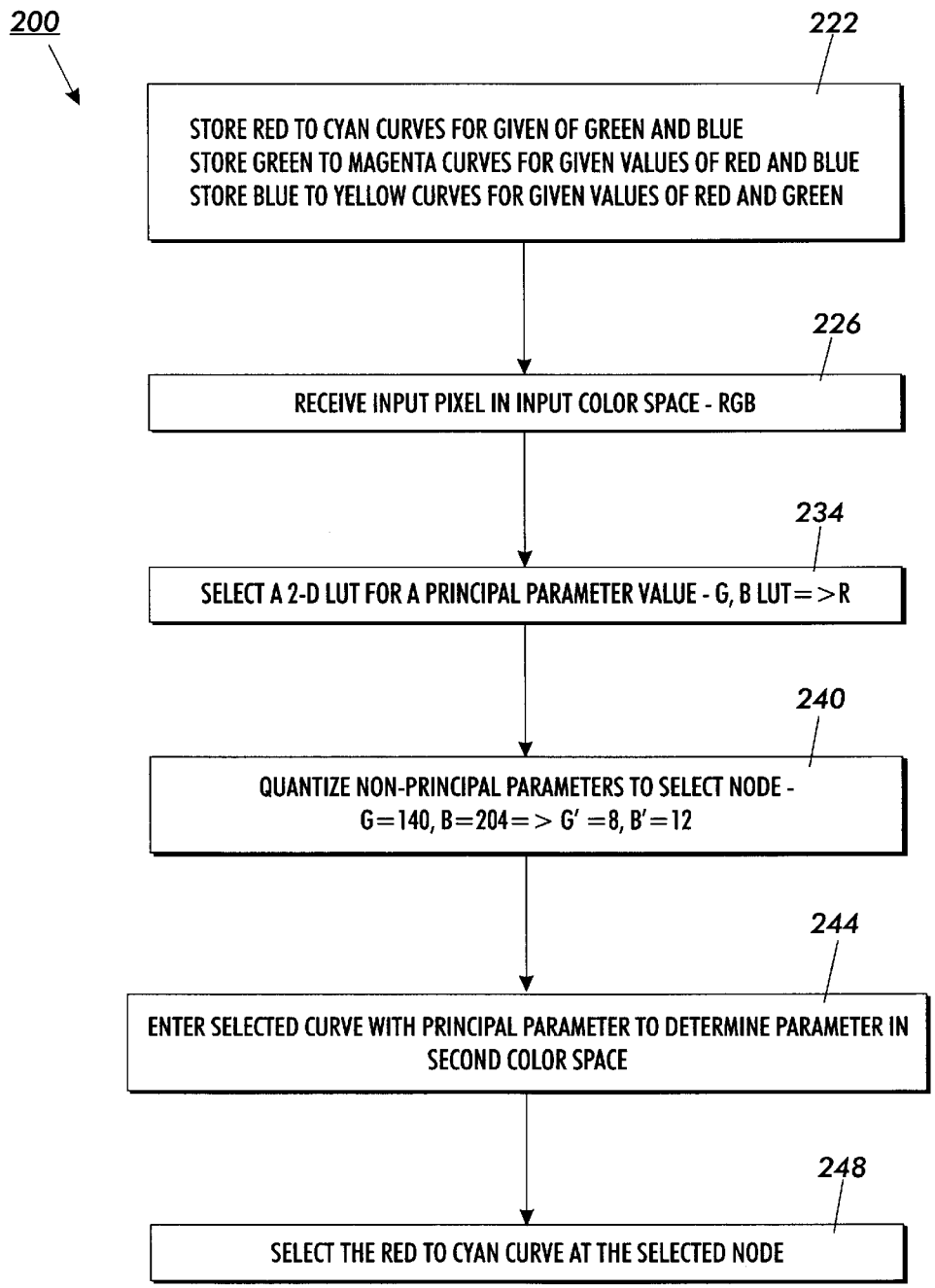
FIG. 2 is a flow chart outlining a method for transforming color descriptions in a first color space to color descriptions in a second color space.

Referring to FIG. 2, a method for color transformation 200 based on the selection or identification of a principal axis is operative to transform a color description from a first color space to a second color space. Typically, the first color space is selected based on the color space of the input image. For example, an image is prepared for display on a computer monitor. Therefore, the image is described in a color space adaptable to computer monitors. For example, the image is described in an RGB or Red, Green, Blue color space. Images described in other color spaces are also beneficially transformed using the method 200. For example, images described in calorimetric RGB, CIELAB, scanner RGB, printer CMY, a printer CMYK and other color spaces can be transformed using the method 200.

Typically, the second color space is selected based on a target device. For example, the target device is a color printer. Therefore, the second color space is selected to be a CMY color space. Of course, the second color space can be any other color space. For example, the second color space can be a printer RGB, printer CMY, a colorimetric RGB, a CMYK, a display RGB or other color space. Preferably, a transformation relationship exists between the first and second color spaces wherein each axis describing the second color space is more heavily dependent on a value of a particular or principal axis in the first color space than the second color space axis depends on values of non-principal axes in the first color space. Such a principal axis s is associated with each second color space. Where such a relationship does not exist, a principal axis is simply assigned to each axis in the second color space, for calculation purposes. This procedure allows the method 200 to be used to some advantage even where strong principal axis relationships do not exist. In such cases, the processing speed advantages of the method 200 can be enjoyed at the expense of reduced transformation accuracy.

Figure 1:
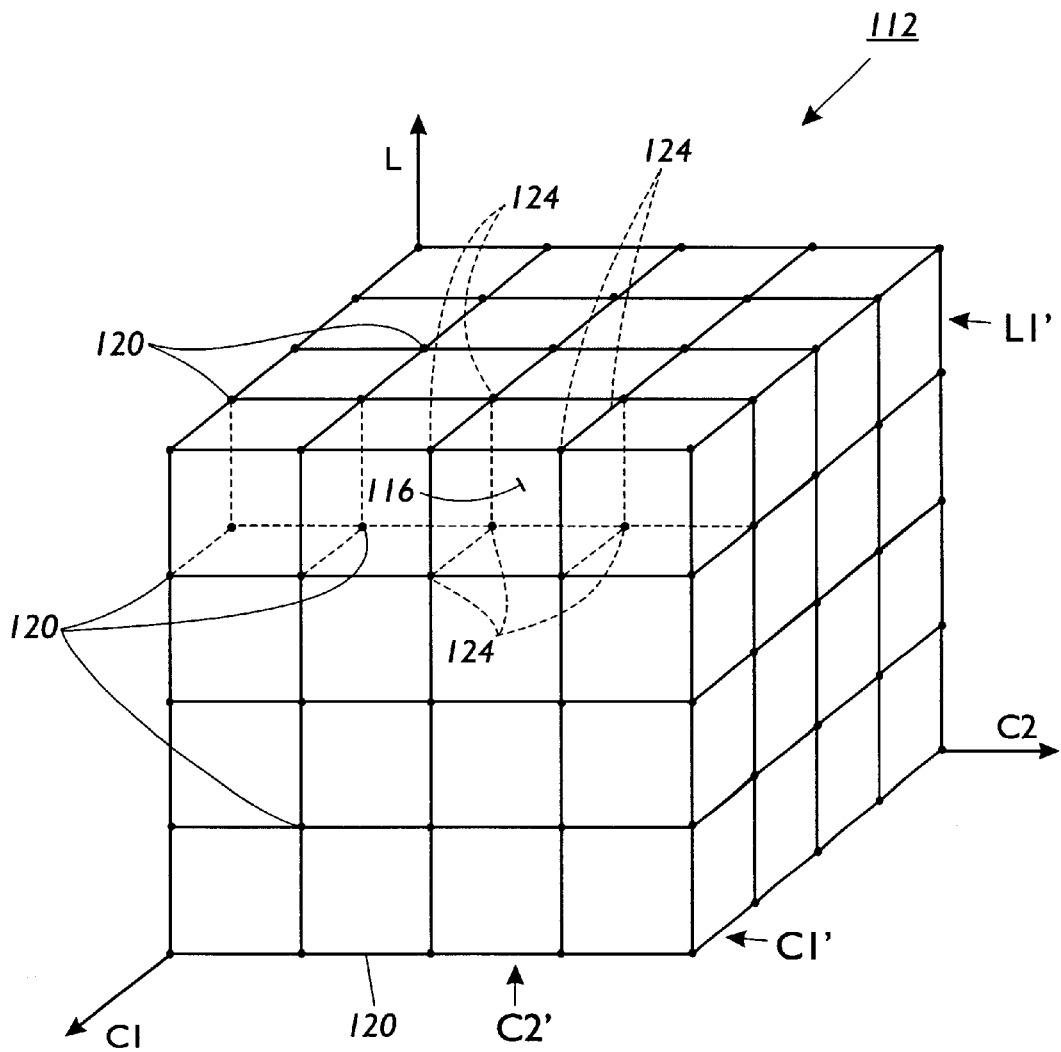
FIG. 1 is an illustration of a prior art three dimensional look-up table.

In a curve storage step 222, a set of transformation curves relating second color space axes to associated principal axes is determined and stored. Preferably the set of curves is predetermined. For example, known multi-dimensional look-up tables, such as, for example, the 3-D look-up table depicted in FIG. 1 is used in order to generate the set of curves. Alternatively, calibration or look-up table generation techniques are be modified and adapted to generate the curves. Each curve in the set relates the principal axis to a value of the second set axis given a set of values for remaining first set axes. For example, where input is expected to be described in terms of an RGB color space and the principal axis is a value of red, the remaining axes are green and blue. Each curve in the set describes a relationship between red and, for example, cyan, given a particular set of values for the green and blue axes. In other words, where it is predetermined that a transformation relationship between red and cyan is affected by values of blue and green for an RGB input, a set of transformation curves from red to cyan are determined based on various values of blue and green.

For example, a first transformation curve is determined relating red to cyan when a value of blue is 15 and a value of green is 47. Additionally, a second transformation curve is determined relating red to cyan when a value of blue is 224 and a value of green is 0. Furthermore, additional curves are determined for other values of blue and green. The number of curves in a given set is a function of required transformation accuracy.

As accuracy requirements become more stringent, the number of curves increases. Transformation curves are generated for selected values of the non-principal axes. The values selected can be based on a regular increment as in examples below or they can be carefully selected. For example, in some embodiments more curves are generated where small changes in the non-principal (or remaining) axes have significant effect on the principal axis to second set axis transformation relationship. Additionally, in some embodiments fewer curves are generated where large changes in the non-principal axes have relatively little effect on the principal axis to second set axis transformation relationship.

In a color receiving step 226, an input pixel or color, described with axes in the first color space is accepted for transformation to into a pixel or color described by second color space axes.

One of the second set axes is selected for value determination. For example, a first second set axis, such as a cyan axis, is selected for value determination. In a look-up table selecting step 234 a set of curves is accessed that describe the relationship between the selected second set axis and the primary axis associated with the selected second set axis. For example, a set of curves is accessed that describes a transformation relationship between cyan and red.

In a curve selection indices determination step 240, index values are determined for selecting an appropriate curve from the set. For example, the non-principal axis values in the input pixel are examined in order to determine the appropriate curve to select from the set or look up table. Preferably, the examination process is efficient with regard to calculation time. For example, the examination takes the form of non-principal axis value quantization, or resolution reduction, process. Quantization or resolution reduction is a process by which the least significant bits or high-resolution portion of a value is discarded. For example, where a range of values is normally described with eight bits, (thereby defining 256 discrete levels, bins, or values) quantization removes or discards some of the low order bits. For example, the four least significant bits are discarded. The remaining four bits (the most significant bits) define 16 levels, bins, or values. Where the primary axis to second set axis transformation curves are predetermined for regularly spaced intervals of non-principal axis values, quantization can be used to determine indexes for appropriate curve selection. For example, where red to cyan transformation curves are calculated for every sixteenth value of blue and green the four-bit quantization described above is used to determine red to cyan transformation curve selection index values.

In a curve selection step 244 the curve referred to by the determined index values is selected for use in a selected second set axis value determination step 248. In the selected second set axis value determination step 248 the primary axis is used as an entry or index into the selected curve. Preferably, the primary axis has a strong transformation relationship with the selected second set axis. Therefore high resolution is maintained with regard to the primary axis to second set axis transformation curves. For example, in an eight-bit system a second set axis value is provided for each of the two hundred and fifty six primary axis values.

Of course, curve-accessing step 234, curve selection indices determination step 240, curve selection step 244, and second set axis value determination step 248 may be repeated for any undetermined second set axes. For example, the steps 234, 240, 244, 248 may be repeated with regard to magenta and yellow axes in a CMY color space. In those cases, green and blue are the principal axes, respectively.

Figure 3:
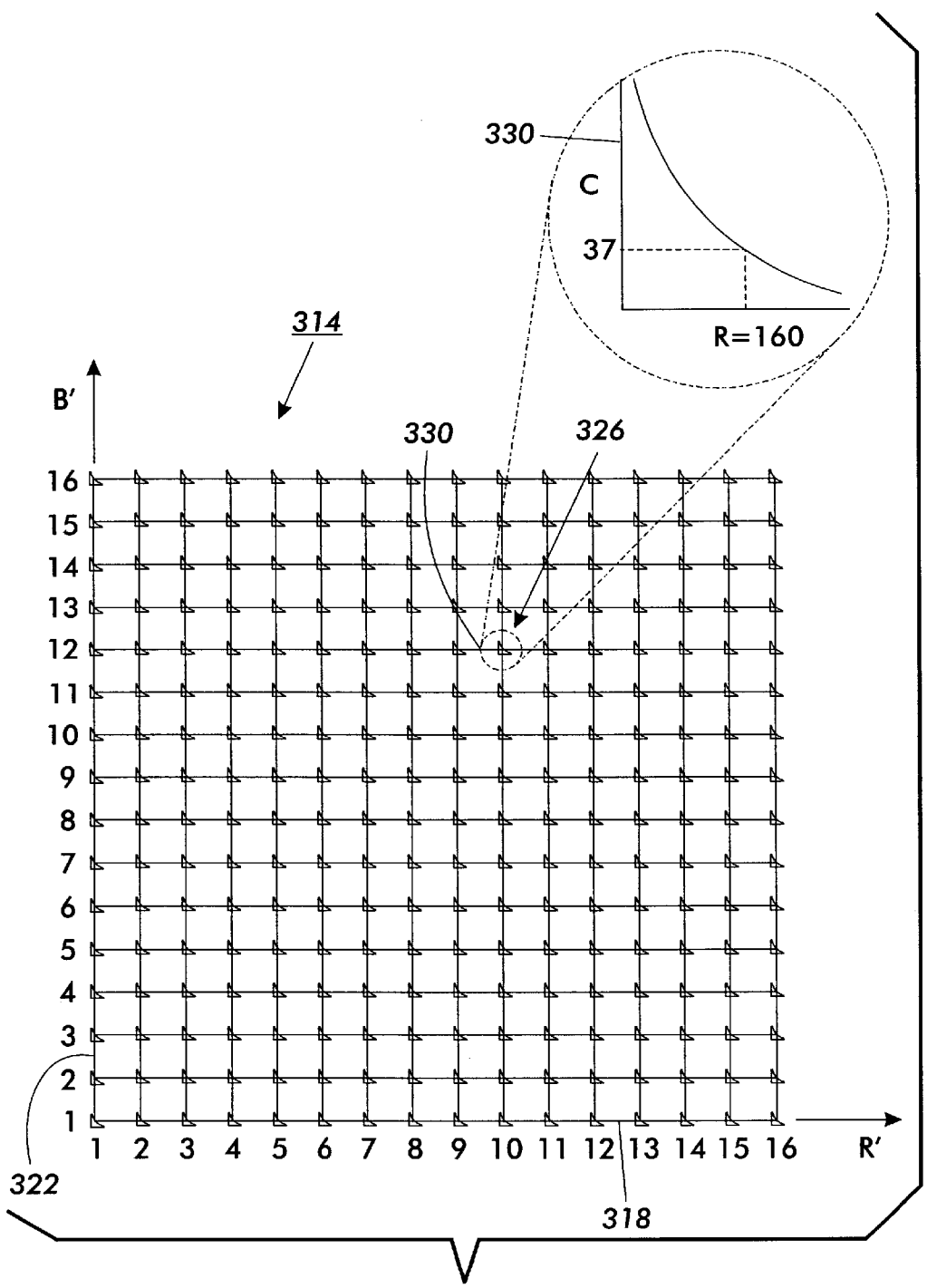
FIG. 3 is a diagram illustrating certain aspects of the method of FIG. 2 wherein a value of a second color space axis is determined.

The method 200 may be better understood through the use of a detailed example. With reference to FIG. 3, consider the conversion or color correction of an image described in an RGB space of a scanner. An image processor user wants to print a copy of the scanned image. The printer operates in, for example, CMY color space. It is predetermined that the amount of cyan colorant that should be used in rendering a pixel is strongly dependent on the redness of the pixel. Therefore, red is a principal axis with regard to the amount of cyan used to print a pixel. Likewise, green is a principal axis with regard to magenta "M" colorant and blue is a principal axis with regard to yellow "Y" colorant.

In order to determine the amount of cyan to use to represent a pixel from the scanned image a predetermined set of curves, similar to tone reproduction curves is accessed. The values of green "G" and blue "B" are used to generate indexes into the set of tone reproduction curves. For example, the tone reproduction curves are thought of as being organized in a two-dimensional grid or array 314. As illustrated, increasing values of green in the input pixel address tone reproduction curves located increasingly further to the right along a green axis 318 of the grid 314. Likewise, increasing values of blue in the input pixel address tone reproduction curves located higher up a blue axis 322 of the grid 314.

Various techniques can be used to convert green and blue pixel values into grid indexes. Preferably, the technique used is computationally inexpensive. For example, quantization is used. As illustrated the green axis 318 is divided into sixteen levels. The blue axis 322 is also divided into sixteen levels. As mentioned above, typically each axis in the input pixel is divided into two hundred and fifty six levels. Quantizing the input pixel reduces the resolution of the pixel, for the purposes of indexing. For example, the four least significant bits of each axis value are removed. This has the effect of dividing the axis values by sixteen and ignoring any remainder, thereby binning or classifying axis values into one of sixteen groups. Removing the four least significant is typically accomplished with four extremely computationally inexpensive shift operations. For example, an input pixel 326 has a green value G=140 and a blue value B=204. By shifting the bits that represent those values, or by dividing by 16 and discarding the remainder, tone reproduction curve index values G'=8, B'=12 are determined.

A cyan tone reproduction curve CTRC(8,12) 330 describes in fine detail the relationship between the input pixel red value "R" and the level of cyan "C" in needed in an output pixel, for the particular green value and blue value. Furthermore, through an effect of quantization, CTRC(8,12)

330 is used as an approximation of the relationship between input red values and output cyan values when green values range from G=128 to G=143 and blue values range from B=198 to B=213. In the example, the red value for the input pixel is R=160. Therefore using CTRC(8,12) 330 the output cyan value is determined to be C=37. The relationship between all the axis values (e.g. RGB) of the input pixel contribute then to determine the amount of cyan needed in an output pixel. Significantly, through employment of the above described procedure, NO interpolation is required. The node in the two-dimensional 'G-B' plane is determined through quantization (inducing some error, though not in an area easily perceivable by the human visual system) and the fairly precise curve at that node contains the relationship required to convert, preferably by simple look-up, the principal 'R' axis value of the input color space or first protocol to the output 'C' axis value.

Figure 4:
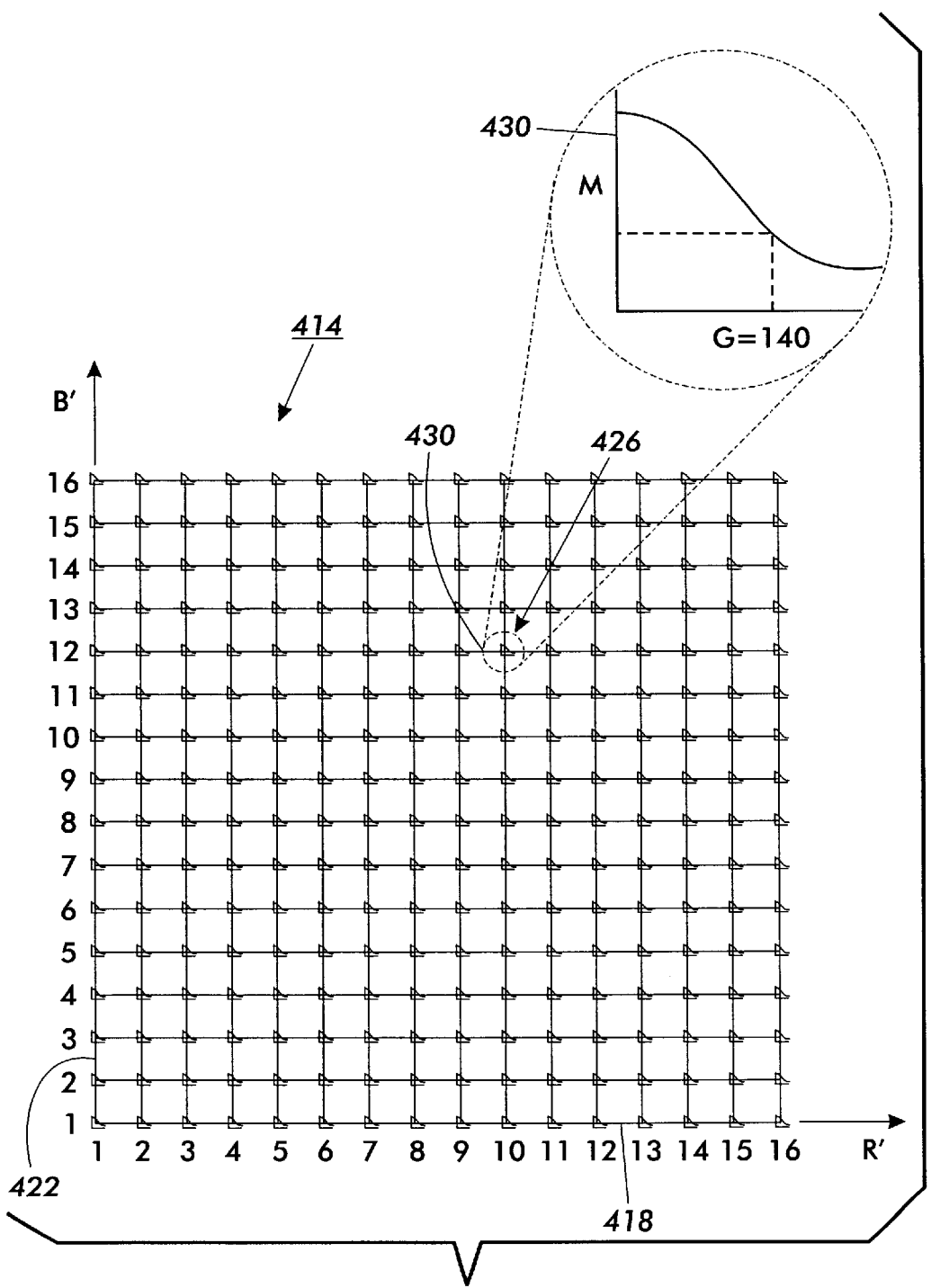
FIG. 4 is a diagram similar to the diagram of FIG. 3 wherein a value of another second color space axis is determined.

A similar process is performed to transform the input pixel with regard to a magenta output colorant. As mentioned above, the example input pixel has red, green and blue values of R=160, G=140, and B=204. As will be apparent to those skilled in the art, green is the primary axis with regard to magenta. Therefore, the non-principal axes, red and blue, are used to determine an index value in order to find the appropriate predetermined TRC within a set of green verses magenta TRCs. Referring to FIG. 4, the green verses magenta tone reproduction curves are also thought of as being organized in a two-dimensional grid or array 414. As illustrated, increasing values of red in the input pixel address tone reproduction curves located increasingly further to the right along a red R' axis 418 of the grid. Likewise, increasing values of blue in the input pixel address tone reproduction curves located higher up a blue B' axis 422 of the grid.

Again, by shifting bits four times or dividing by 16 as before, the red and blue values yield index values of R'=10 and B'=12. Therefore, in the R'B' plane, the input pixel 426 is located at R'=10, and about three quarters of the way between the B'=12 and B'=13 positions. The fractions position between B'=12 and B'=13 is determined by examining the remainder of the division. This examination is not part of the process. The examination is mentioned only to further explain the effect of quantization. The magenta tone reproduction curve MTRC(10,12) 430 describes the relationship between the green value "G" in an input pixel and the level of magenta "M" in an output pixel, when the green value in the input pixel is R=160 and when the blue value in the input pixel is 192. Furthermore, by the effect of quantization, MTRC(10,12) 430 is used as an approximation of the relationship between input green values and output magenta values when red values range from R=160 to R=175 and blue values range from B=198 to B=213. In the example input pixel the green value is G=140 and so the output magenta value is M=100. The required value of magenta is read with high resolution from MTRC(10,12) 430.

Figure 5:
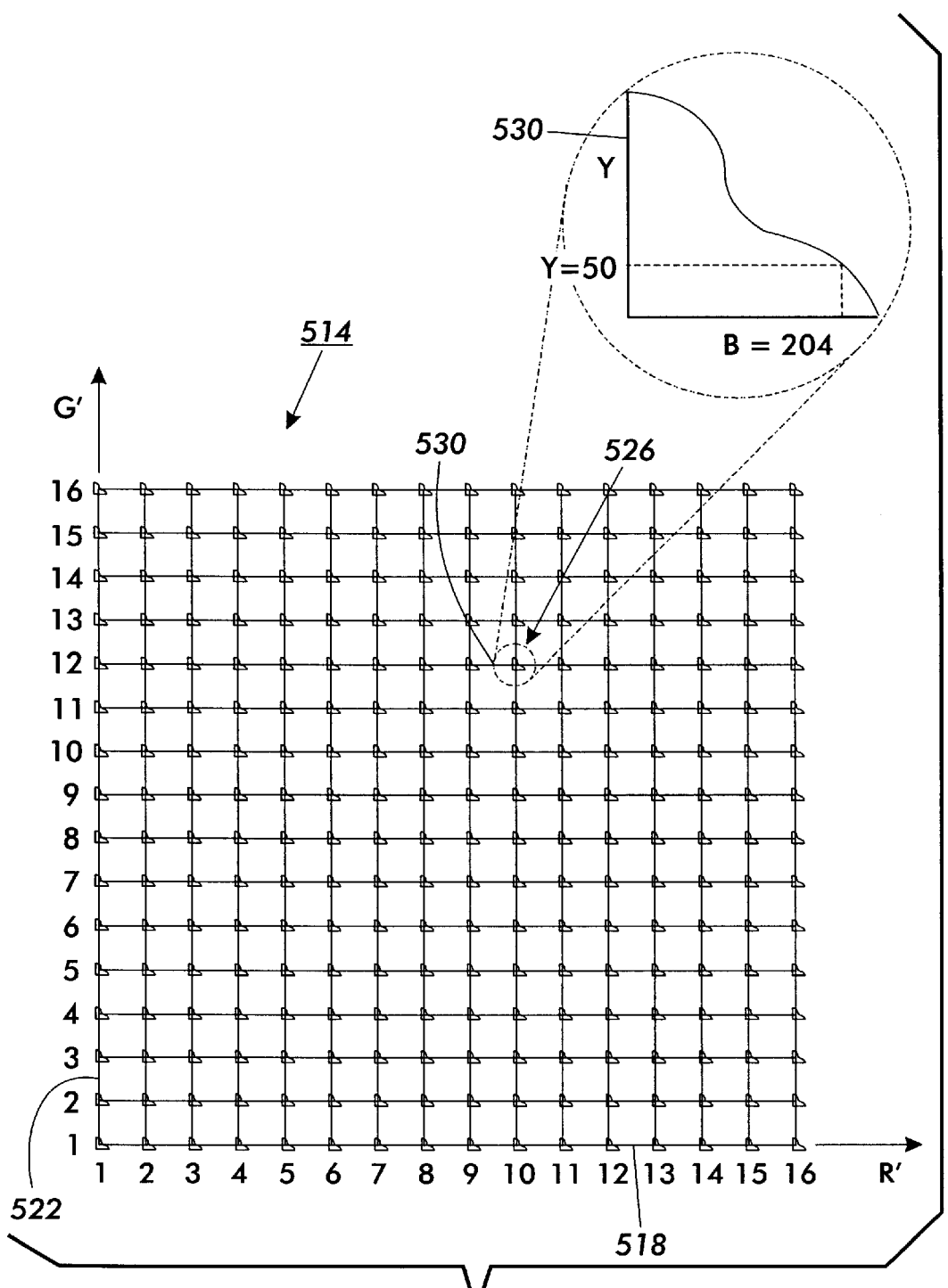
FIG. 5 is a diagram similar to the diagrams of FIG. 3 and FIG. 4 wherein a value of a third second color space axis is determined; and, FIG. 6 is a block diagram of an image processor operative to perform the method of FIG. 2.

Again a process like those described in relation to FIG. 3 and FIG. 4 is performed to transform the input pixel with regard to a yellow output colorant. To reiterate, the example input pixel has red, green and blue values of R=160, G=140, and B=204. Blue is the primary axis with regard to yellow. Therefore, the remaining non-principal axes; red and green, are used to determine an index value for locating the appropriate TRC within a set of blue verses yellow TRCs. Referring to FIG. 5, The blue verses yellow tone reproduction curves are thought of as being organized in a grid or array 514. As illustrated, increasing values of red in the input pixel address tone reproduction curves located increasingly further to the right along a red R' axis 518 of the grid. Likewise, increasing values of green in the input pixel address tone reproduction curves located higher up a green G' axis 522 of the grid. By shifting bits four times or dividing by 16 as before, the red and blue values yield index values of R'=10 and B'=12. By examining the remainder from the division it is seen that in the R'G' plane, the input pixel 526 is at R'=10 and about three quarters of the way between the G'=8 and G'=9 positions.

The selected yellow tone reproduction curve YTRC(10,8) 530 describes the relationship between the blue value "B" in an input pixel and a level of yellow "Y" required in a related output pixel when the red value in the input pixel is R=160 and when the green value in the input pixel is 192. Furthermore, YTRC(10,8) 430 is used as an approximation of the relationship between input green values and output Magenta values when red values range from R=160 to R=175 and blue values range from B=198 to B=213. In the example input pixel, the blue value is B=204 and so the output yellow value is Y=50 as read from YTRC(10,8) 330.

The curves 330, 430, 530 have been illustrated as graphs. Of course, the curves 330, 430, 530 and the entire arrays of curves 314, 414, 514 are not usually stored or used in graphical form. Preferably, each curve in the arrays of curves 314, 414, 514 is stored as a look-up table. Alternatively, the curves are stored as mathematical functions, such as, for example, polynomial functions. Whatever form the curves are stored in, the curves are stored and retrieved so that the data they contain can be addressed or accessed through the use of indices such as, for example, those described above.

Thus far the method 200 has been described and illustrated in relation to an RGB input or first color space and a CMY output or second color space. However, the method is equally applicable to other transformations. For example, transformations from colorimetric RGB to printer RGB space, colorimetric RGB to printer CMY space, CIELAB to device L*a*b* space, scanner RGB to colorimetric RGB space and others are performed using the method 200. Of course, transformations in the reverse directions are also possible.

Implementations of the method 200 can perform the required transformations much faster than prior art methods based on, for example, three dimensional look up tables and tetrahedral interpolation. As mentioned, one implementation of tetrahedral interpolation from 3D input to 4D output requires 12 multiplications, 14 additions 2.5 comparisons, 19 look-ups and 2 shifts per image pixel. By contrast, one embodiment of the method 200 described here is implemented with 0 multiplications, 2 additions, 7 lookups and 2 shifts per pixel.

Figure 6:
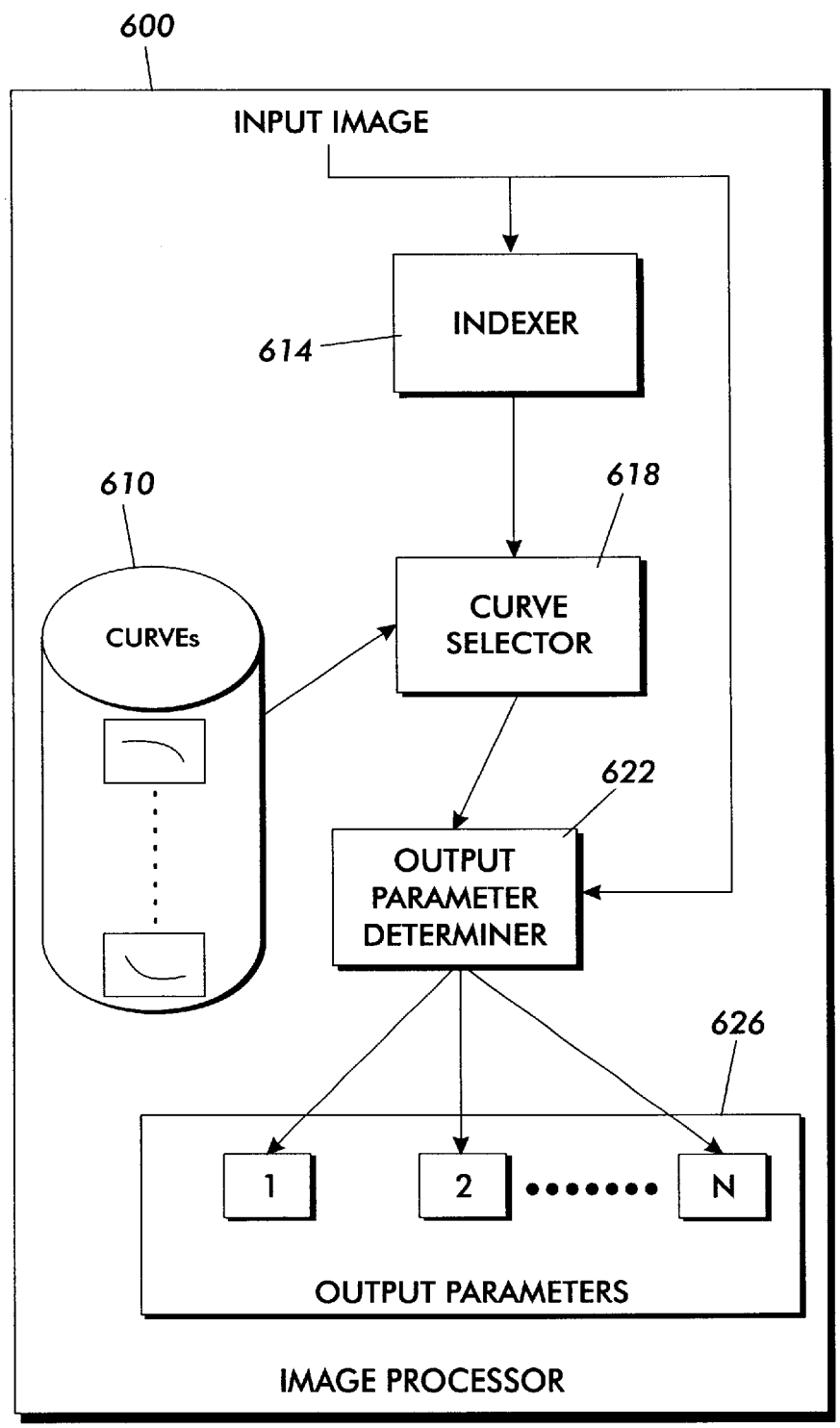

Referring to FIG. 6, an image processor 600 operative to perform the method for color correction transformation 200 comprises a library of transformation curves 610. Typically the curves are predefined. For example, the curves are installed at an image processor factory. However, some curves may be developed at run time. For example, a set of predefined RGB to CMY curves can be used to generate a set of CMY to RGB curves at run time.

The image processor 600 further comprises a set of software modules stored in a computer memory (not shown) and processed by a computational device (not shown) such as a microprocessor or digital signal processor. The software modules are operative to analyze colors or pixels described in terms of a first color space and access the curves in the curve library 610. Additionally the software modules use the accessed curves to transform the first color space pixels into pixels described in terms of a second color space. For example, the image processor comprises an indexer module 614, a curve selector 618 and an output axis value determiner 618. The indexer module 614 generates index values for the curve selector 618 to use in selecting appropriate transformation curves. For example, the indexer quantizes 614 the values in the RGB pixels and passes the color space classification and the quantized values to the curve selector 618. Based on the information provided by the indexer 614, the curve selector accesses the appropriate curve classification and uses the quantized values to select the appropriate transformation curves. For example, the curve selector 618 accesses scanner RGB to printer CMY curves.

As the indexer 614 examines each image pixel, the curve selector 618 uses, for example, the quantized versions of the pixel values, to provide the appropriate curve data to the output axis value determiner 622. With regard to each pixel, the output axis value determiner 622 receives access to, for example, the appropriate red vs. cyan curve, green versus magenta curve and blue versus yellow curve. The output axis value determiner 622 also receives pixel values for each pixel. For example, the output axis value determiner 622 receives red, green and blue values for each pixel. The output axis value determiner 622 uses the primary axis associated with each curve it has access to as an index into the curve. In this way the output axis value determiner 622 determines an output or second color space axis value for each second color space axis.

For example, the output axis value determiner 622 uses a pixel red value as an index into a red versus cyan curve that the curve selector 618 grants the output determiner 622 access. Thereby the output determiner 622 determines a cyan value associated with the pixel. Likewise, the output determiner 622 uses the pixel green value as an index to determine a magenta value and uses a blue value to determine a yellow value. The determined values are output axes 626. The number of output axis values depends on the output or second color space. For example, if the second color space is a CMYK color space then there are four output axes. If the output color space is a HI-FI color space then there are five or more output axes. Together, the output axis values are, for example, an output or second color space pixel. Alternatively, the output axes 626 are further processed. For example, where the output axes 626 describe a pixel in CMY space, the output axes 626 may undergo an under color removal process (not shown) or a gray component replacement process (not shown). These processes further transform the CMY pixel into a CMYK color space. Of course, the image processor 600 can perform the method for color correction transformation 200 to directly transform an input pixel to a CMYK color space pixel. For example, it is anticipated that since K or black colorant strongly modulates the luminance of a CMYK pixel, and since luminance is most strongly modulated by G or green in an RGB pixel, that G can be used as a primary axis with regard to determining K values.

The invention has been described with reference to particular embodiments. Modifications and alterations will occur to others upon reading and understanding this specification. For example, different software modules can perform the functions of the indexer 614, curve selector 618 and output determiner 622. For example, the functions can be performed by a single transformation module. The image processor 600 can be an application specific machine or it can be implemented as part of a multipurpose device. For example the image processor 600 can be a document processor or the image processor 600 can be implemented as part of the features and functions of a personal computer system. The method for color correction transformation 200 can be used to transform between color spaces other than those listed. It is intended that all such modifications and alterations are included insofar as they come within the scope of the appended claims or equivalents thereof.

Having thus set forth the preferred embodiments, the invention is now claimed to be:

1. A method of color transformation between a first color space defined by a first set of axes and a second color space defined by a second set of axes, the method comprising the steps of:
    associating with each axis in the second set, a principal axis from the first set, the principal axis characterized by a predominating transformation relationship the principal axis has with a second set axis; and
    storing a set of tone reproduction curves adapted to transform a principal axis value to a related output value wherein a given tone reproduction curve is selected based on non-principal axis values in the first set.

2. The method of claim 1 further comprising:
    accepting an input described by first set axis values for transformation to second set axis values;
    selecting a principal axis value of the input for transformation;
    accessing a tone reproduction curve based on non-principal axis values of the input; and,
    using the principal axis value and the tone reproduction curve to determine a second set axis value.

3. The method of claim 2 wherein the step of accessing comprises quantizing the non-principal axis values in the first set to arrive at a node containing the TRC.

4. The method of claim 2 further comprising:
    repeating the steps of selecting, accessing, and using to transform the other input axis values to values in the second color space.

5. The method of claim 4 further comprising:
    manipulating the second set axis values with an under color removal process to arrive at a third set of axis values describing the color in a third color space.

6. A method of determining a component of an output color based on an input color comprising:
    projecting the input color on a two-dimensional plane comprised of nodes relating two components of the input color to a plurality of stored principal dependent relationships between another component of the input color and a component of the output color; and,
    computing from a selected one of the plurality of stored relationships the component of the output color based on the other component of the input color.

7. The method as set forth in claim 6, further comprising selecting one of the plurality of nodes based on proximity to the input color.

8. The method as set forth in claim 6, further comprising:
    identifying a principal dependent relationship between a component of an input color and a component of an output color; and,
    storing the principal dependent relationship for selected values of the input color component and the output color component at each of the nodes.

9. The method as set forth in claim 8, further comprising:
    repeating the identifying and storing steps for other components of the input color and output color until a principal dependent relationship is defined for each component of the output color.

10. The method as set forth in claim 9, further comprising:

repeating the projecting and computing steps for other components of the input color until each component of the output color is computed.

11. An image processor operative to use principal axes in the transformation of an input from one color space to another, the image processor comprising:

a plurality of transformation curves, each curve describing a relationship between a principal axis in a first color space and a related axis in a second color space at particular values of non-principal axes; and, software stored in a computer memory and processed by a computational device, the software operative to; analyze a pixel in a first color space, access the plurality of transform curves based on the analysis, and use the curves to generate the color in a second color space.

12. An apparatus for converting a color signal described by a first protocol to a converted color signal described by a second protocol, the apparatus comprising:

a two-dimensional look-up table defined in a memory accessible in real time, the look-up table having inputs including values for selected axes of the first protocol, where a first dimension of the look-up table correlates to a first axis of the first protocol, and where a second dimension of the look-up table correlates to a second axis of the first protocol, and, where nodes of the look-up table store a relation between another axis of the first protocol and an axis of the second protocol.

13. The apparatus as set forth in claim 12, further comprising:

a receiver which receives the color signal described by the first protocol, where values of the first and second axes of the color signal operate to select a node in the look-up table, and where a value of a third axis of the color signal operates to determine an output value described by the second protocol based on the relation stored at the selected node.

14. The apparatus as set forth in claim 13, further comprising an image output mechanism which outputs the converted color signal comprised of a plurality of output values.

15. The apparatus as set forth in claim 14, wherein the image output mechanism comprises a xerographic printer.

* * * * *